United States Patent [19]
Edmunds

[11] 3,810,531
[45] May 14, 1974

[54] LOCK UP CLUTCH CONTROL
[75] Inventor: John O. Edmunds, Indianapolis, Ind.
[73] Assignee: General Motors Corporation, Detroit, Mich.
[22] Filed: Sept. 5, 1972
[21] Appl. No.: 286,161

Related U.S. Application Data
[62] Division of Ser. No. 169,377, Aug. 5, 1971, Pat. No. 3,719,093.

[52] U.S. Cl. ................... 192/3.3, 74/733, 74/645, 192/3.57
[51] Int. Cl. ............................................ F16d 33/12
[58] Field of Search ................. 192/3.3, 3.29, 3.57; 74/733, 645

[56] References Cited
UNITED STATES PATENTS
3,691,872  9/1972  Schaefer et al. ............. 192/3.29 X
3,682,043  8/1972  Bailey et al. ................. 192/3.3 X
3,621,955  11/1971 Black et al. .................. 192/3.33 X
3,505,907  4/1970  Fox et al. .................... 192/3.29 X
3,241,399  3/1966  Fisher et al. ................. 192/3.3 X
3,181,677  5/1965  Fisher et al. ................. 192/4 B
3,073,179  1/1963  Christenson .................. 74/733 X Primary Examiner—Samuel Scott
Assistant Examiner—Lance W. Chandler
Attorney, Agent, or Firm—D. F. Scherer

[57] ABSTRACT

A control for a transmission having a fluid coupling and a lock up clutch for selectively providing a fluid or mechanical input from a gas turbine engine. A shift valve controls the engagement and disengagement of the lock up clutch in response to a transmission output governor signal or a manual signal in cooperation with the governor signal. The manual signal is controlled by a control valve which also supplies a disengagement bias pressure to the shift valve when the manual signal is not directed to the shift valve. The manual signal is generated in response to an engine operating parameter, such as torque demand, and acts on the shift valve in such a manner as to prevent engagement of the lock up clutch at zero vehicle speed above a predetermined value of the operating parameter.

2 Claims, 2 Drawing Figures

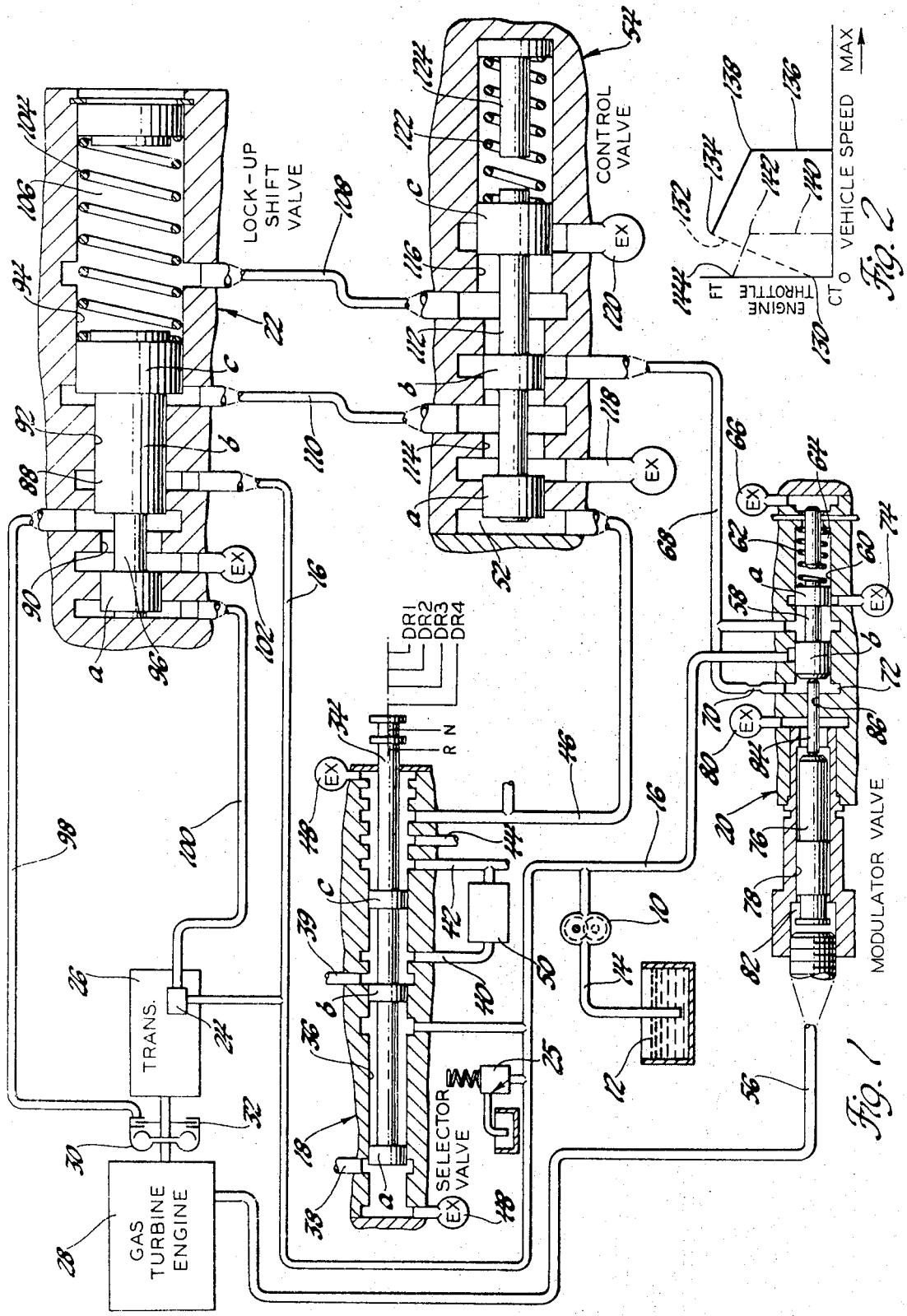

LOCK UP CLUTCH CONTROL

This application is a division of application Ser. No. 169,377, now Pat. No. 3,719,093.

This invention is related to lock up clutch controls and more particularly to controls providing automatic and selective engagement of the lock up clutch.

When combining a multi-range transmission and a gas turbine engine it is often desirable to use a fluid coupling between the engine and transmission so that the engine may run freely at idle conditions. However, in many instances it is desirable to directly couple the engine and transmission to provide maximum tractive effort for maximum acceleration of the vehicle from the idle condition. Therefore, a lock up clutch is incorporated in the transmission to provide a mechanical drive connection between the engine and the transmission gearing. To permit selective engagement and disengagement of the lock up clutch a control must be provided. The present invention provides such a control through the selective operation of a shift valve and a control valve. The shift valve controls the engagement and disengagement of the lock up clutch and is biased toward the disengaged position by a bias spring and a bias pressure supplied by the control valve. During normal operation the shift valve is upshifted by transmission governor pressure acting in opposition to the bias pressure. However, if the operator desires to have maximum starting tractive effort, the control valve may be shifted by manual valve to permit an engagement bias pressure to be directed to the lock up shift valve while exhausting the disengaging bias pressure. The engagement bias pressure is preferably inversely proportional to engine torque demand or engine power output so that the shift valve cannot be shifted above a predetermined engine torque output at zero vehicle speeds. The control is tailored so that the lock up clutch can be engaged at higher throttle settings with increased vehicle speeds.

It is, therefore, an object of this invention to provide in an improved control for an engine driven multi-range transmission having a lock up clutch, a shift valve responsive to governor pressure to provide an automatic engagement of the lock up clutch and a control valve responsive to a manual valve for selectively controlling the shift valve.

It is another object of this invention to provide in an improved control for controlling a lock up clutch a shift valve for controlling the engagement and disengagement of the lock up clutch and a control valve operable in one position to provide a disengagement bias pressure to the shift valve and selectively movable to another position to provide an engagement bias pressure to the shift valve to permit selective engagement of the lock up clutch.

Another object of this invention is to provide in an improved transmission control a shift valve responsive to governor pressure for providing automatic engagement of a lock up clutch and a control valve cooperating with the shift valve for permitting selective engagement of the lock up clutch when the transmission is operated according to a predetermined engine throttle and vehicle speed characteristic.

Another object of this invention is to provide an improved control having a shift valve and control valve for providing automatic engagement of a clutch in one throttle setting range at a fixed transmission speed and in another throttle range at various transmission speed and providing manual selective engagement of the clutch below a predetermined throttle setting at zero vehicle speed and at or below increased throttle settings with increased vehicle speed.

These and other objects and advantages of the present invention will be more apparent from the following description and drawings in which:

FIG. 1 is a diagrammatic view of the control; and
FIG. 2 is a curve depicting selective and automatic operation of the control.

Referring to FIG. 1 wherein like characters represent the same or corresponding parts there is shown a conventional gear pump 10 which draws fluid from a reservoir 12 through a passage 14 and delivers fluid through a main passage 16 to a manual selector valve 18 and modulator valve 20, a lock up shift valve 22 and a transmission output governor 24. Pressure in main passage 16 is controlled by a regulator valve 25. The governor 24 is a conventional fluid governor which supplies a fluid pressure in proportion to speed and is connected to be driven by the output shaft of the transmission 26. The transmission is driven by a gas turbine engine 28 through a fluid coupling 30 and provides selective drive ranges including a low range. The transmission 26 may be connected directly to the engine 28 by a lock up clutch 32. A more complete description of the transmission 26 may be found in U.S. Ser. NO. 104,867, filed January 8, 1971 and assigned to the assignee of this invention.

The manual selector valve 18 includes a valve spool 34 having three equal diameter spaced lands $a$, $b$ and $c$ slidably disposed in a valve bore 36 which is in fluid communication with the main passage 16. Also in fluid communication with the valve bore 36 is a reverse passage 38, a drive four (DR 4) passage 39, a hold passage 40, a drive three (DR 3) passage 42, a drive two (DR 2) passage 44 and a drive one (DR 1) passage 46 and a pair of exhaust passages 48. The valve spool 34 is selectively movable in the valve bore 36 to permit fluid communication between the main passage 16 and the various drive passages 38, 39, 42, 44 and 46. The passage 42 is in fluid communication with the passage 40 through a hold regulator valve 50 which is described in detail in U.S. Ser. No. 104,867, which also describes the fluid connections from the selector valve 18 to a plurality of shift valves and relay valves which provide selective and automatic shift control for the drive ranges of the transmission 26. The drive one passage 46 is in fluid communication with the chamber 52 which is part of a control valve generally designated 54.

The modulator valve 20 is in fluid communication via a passage 56 with the gas turbine engine 28 and receives therefrom a pressure signal proportional to compressor discharge pressure. The modulator valve 20 provides a modulator pressure inversely proportional to engine torque demand or power developed and has a valve element 58 having equal diameter spaced lands $a$ and $b$ slidably disposed in a valve bore 60. A bias spring 62 located in a spring chamber 64 vented by an exhaust passage 66 biases the valve element 58 to an open position connecting main passage 16 with a modulator pressure passage 68 between lands $a$ and $b$. The modulator pressure passage 68 is connected through a restriction 70 to a chamber 72 at one end of valve bore 60 adjacent the end of land $b$. Pressure in chamber 72 biases the valve element 58 against the spring 62 to connect the modulator pressure passage 68 to an exhaust passage 74. A bias force directly proportional to compressor discharge pressure is also imposed on the valve element 58 through an actuator stem 76 slidably mounted in a bore 78. One end of the bore 78 is exhausted through passage 80 while the other end of the bore is in communication with a chamber 82 which is connected to the compressor of the gas turbine engine. The actuator stem 76 engages a pin 84 which is slidably disposed in a valve bore 86 and abuts valve land b of valve element 58. The force imposed on the actuator stem 76 and therefore the pin 84 is directly proportional to the compressor discharge pressure and therefore increases with increasing compressor discharge pressure. This force acts in opposition to the bias spring 62 thereby decreasing the bais on the valve element 58 as compressor discharge pressure increases so that a regulated pressure in modulator pressure passage 68 develops which is inversely proportional to compressor discharge pressure.

The lock up shift valve 22 includes a valve element 88 having stepped diameters a, b and c which are slidably disposed in stepped diameter bores 90, 92 and 94 respectively. The valve element 88 has a reduced stem portion 96 located between lands a and b to permit selective fluid communication between mainline passage 16 and a lock up clutch engagement passage 98 which is in fluid communication with the lock up clutch 32 and between the passage 98 and an exhaust passage 102. The free end of land a is in fluid communication with a governor passage 100 which supplies the governor pressure thereto from the transmission output governor 24. In the position shown, which is in the lock up clutch disengagement position, lock up pressure passage 98 is exhausted to permit disengagement of the lock up clutch 32. The valve element 88 is biased to the disengaged position shown by a bias spring 104 which is located in a bias chamber 106 which is in fluid communication with a disengagement bias pressure passage 108 connected to the control valve 54. The differential area between lands b and c is in fluid communication with an engagement bias pressure passage 110 which is also connected with the control valve 54. The valve element 88 has two differential areas, namely, between lands a and b and lands b and c which provide piston areas for linear fluid motors. The ends of valve element 88 are in closed chambers so that they may act as pistons for linear fluid motors. It is obvious from the above description that four separate linear fluid motors are provided.

The control valve 54 has a valve element 112 having equal diameter spaced lands a and b slidably disposed in a valve bore 114 and a larger diameter land c slidably disposed in a valve bore 116. The valve bore 114 is in fluid communication with the chamber 52 and exhausts passage 118, the engagement bias pressure passage 110 and the modulator pressure passage 68. The disengagement bias pressure 108 is in fluid communication with both bores 114 and 116 while valve bore 116 is in fluid communication with an exhaust passage 120. The valve spool 112 is biased to the left by a spring 122. When the valve spool 112 is moved fully to the left, modulator pressure in passage 68 is directed between lands b and c through passage 108 to the chamber 106. This modulator pressure also acts on the differential area between lands b and c to move the valve spool 112 to the right against spring 122 thereby limiting the maximum value of the pressure available in chamber 106. As mentioned previously, the pressure in passage 68 decreases as compressor discharge pressure increases therefore as engine torque demand or power developed increases the pressure in passage 68 decreases until the pressure acting on the differential area of lands b and c cannot overcome the force in spring 122 at which time the disengagement bias pressure in chamber 106 will be equal to the modulator pressure in passage 68. When the selector valve 18 is moved to the drive one or low range position the chamber 52 is pressurized which will cause the valve spool 112 to move fully to the right against the spring 122 until the free end of valve land c comes into contact with the stop member 124. At this time the modulator pressure passage 68 will be in fluid communication with the engagement bias pressure passage 110 between lands a and b of valve element 112. Also, at this time the disengagement bias pressure passage 108 will be exhausted between lands b and c through passage 120. If the modulator pressure in passage 68 and passage 110 is sufficiently high so that the force applied to the differential area between lands b and c of valve element 88 can overcome the force in spring 104, the lock up shift valve 22 will move to the engagement position thereby connecting mainline passage 16 with the lock up clutch pressure passage 98 to engage the lock up clutch 32. At low throttle settings the modulator pressure will be sufficiently high to cause the lock up shift valve 22 to assume the engaged position. This is shown by the point 130 on curve 132 of FIG. 2. If the engine throttle setting is higher than point 130, the modulator pressure will not be sufficiently high at zero vehicle speed to cause the lock up shift valve 22 to move. Thus, at this time the connection between the gas turbine engine 28 and the transmission 26 will be through the fluid coupling 30. However, as the vehicle speed increases, governor pressure acting on the free end of valve land a of valve element 88 will increase and will be added to the force of a modulator pressure on the differential area between lands b and c so that at some higher vehicle speed, along curve 132, the lock up clutch 32 will be engaged. At point 134 on curve 132 the combination of modulator pressure and governor pressure will be sufficient to operate the lock up shift valve even though the modulator pressure corresponds to the full throttle setting of the engine 28. If the throttle setting is below the point 130 on curve 132, the lock up clutch will be engaged at zero vehicle speed. Once the lock up shift valve 22 is moved to the engaged position and the lock up clutch 32 is engaged, main pressure acting on the differential area between lands a and b of valve element 88 assists the modulator pressure bias in passage 110 and the governor pressure bias in passage 100 to hold the valve element 88 in the shifted position so that the lock up valve 22 will remain shifted even though the modulator pressure 68 decreases.

During normal operation the lock up shift valve 22 will be moved to the engaged position by governor pressure acting on the free end of valve land a of valve element 88 as shown by curve 136 of FIG. 2. During this operation the governor pressure acting on valve land a is opposed by the disengaging bias pressure in chamber 106 acting on valve land c. For throttle settings between points 134 and 138 on curve 136 it is seen that the disengaging bias pressure is variable so that as vehicle speed increases beyond point 134 the lock up clutch 32 will be automatically engaged at lesser throttle setting. At throttle settings corresponding to point 138 the disengaging bias pressure in passage 108 becomes constant so that a constant bias force, as established by the differential area between lands *b* and *c* of valve element 112 and the spring 122, is applied to the valve element 112. Therefore, at vehicle speeds higher than point 138 the lock up clutch 32 will be engaged automatically and independently of the throttle position. As mentioned above, after the lock up valve 22 has shifted line pressure in passage 16 provides a hysteresis force on the valve element 88 so that disengagement of the lock up clutch occurs at lower vehicle speeds for a corresponding throttle setting. This is shown by curve 140 in FIG. 2. As shown by curve 140, the lock up clutch will stay engaged until the vehicle speed is equal to or less than the point 142 provided the throttle setting is below the point represented by point 142. To maintain the lock up clutch engaged at low vehicle speeds corresponding higher throttle settings are required so that the lock up clutch will remain engaged down to zero vehicle speed at a throttle setting established at point 144.

Obviously, many modifications and variations of the present invention are possible in light of the above teachings. It is, therefore, to be understood that within the scope of the appended claims the invention may be practiced otherwise than as specifically described.

What is claimed is:

1. A control for a clutch for an engine driven transmission comprising, a source of fluid pressure; governor means for supplying a transmission speed signal; modulator means for supplying an engine parameter signal; shift valve means operatively connected between said source and the clutch and being movable to first and second positions for controlling the engagement and disengagement respectively of the clutch including a first valve area in fluid communication with said governor means, a second valve land area, and a differential area; and control valve means operable to provide a bias pressure to said second valve land area to bias said shift valve means toward said second position and being selectively movable to communicate said engine parameter signal from said modulator means to said first differential area to bias said shift valve means toward said first position and to exhaust the bias pressure.

2. A control for a lock up clutch for an engine driven transmission comprising, a source of fluid pressure; governor means for supplying a transmission speed signal; modulator means for supplying a variable engine parameter signal; shift valve means operatively connected between said source and the lock up clutch and being movable to first and second positions for controlling the engagement and disengagement respectively of the lock up clutch including a first valve area in fluid communication with said governor means, a second valve land area, a first differential area, and a second differential area; and control valve means operable to provide a bias pressure to said second valve land area to bias said shift valve means toward said second position which bias pressure is constant during one range of the engine parameter signal and varies with the engine parameter signal during another range and being selectively movable to communicate said engine parameter signal from said modulator means to said first differential area to bias said shift valve means toward said first position and to exhaust the bias pressure when said engine parameter signal is above a predetermined value, said second differential area being in fluid communication with said source when said shift valve means is in said first position to bias said shift valve means to remain in said first position.

* * * * *